United States Patent
De Cambry De Baudimont et al.

(10) Patent No.: US 7,750,083 B2
(45) Date of Patent: *Jul. 6, 2010

(54) SCREW CAP COMPOSITION

(75) Inventors: Guy De Cambry De Baudimont, Brussels (BE); Pascal Vanden Berghe, Limal (BE)

(73) Assignee: Ineos Manufacturing Belgium, Antwerp (BE)

( * ) Notice: Subject to any disclaimer, the term of this patent is extended or adjusted under 35 U.S.C. 154(b) by 0 days.

This patent is subject to a terminal disclaimer.

(21) Appl. No.: 12/385,343

(22) Filed: Apr. 6, 2009

(65) Prior Publication Data

US 2009/0198019 A1    Aug. 6, 2009

Related U.S. Application Data

(63) Continuation of application No. 11/889,854, filed on Aug. 16, 2007, now abandoned, which is a continuation of application No. 10/494,731, filed as application No. PCT/EP02/12382 on Nov. 6, 2002, now abandoned.

(30) Foreign Application Priority Data

Nov. 9, 2001    (EP) .................................. 01204466

(51) Int. Cl.
  *C08L 23/00*    (2006.01)
  *C08L 23/04*    (2006.01)
(52) U.S. Cl. ........................................ 525/191; 525/240
(58) Field of Classification Search ................ 525/191, 525/240
See application file for complete search history.

(56) References Cited

U.S. PATENT DOCUMENTS

| 6,329,054 B1 | 12/2001 | Rogestedt et al. |
| 6,632,884 B1 | 10/2003 | Skar et al. |
| 6,787,608 B2 | 9/2004 | VanDun et al. |
| 2004/0157988 A1 | 8/2004 | Miserque et al. |
| 2009/0198015 A1 * | 8/2009 | De Cambry De Baudimont et al. ...... 525/53 |

FOREIGN PATENT DOCUMENTS

| JP | 58-103542 | 6/1983 |
| WO | WO 00/71615 A1 | 11/2000 |
| WO | WO 02/34829 A1 | 5/2002 |
| WO | WO 02/36678 A1 | 5/2002 |

* cited by examiner

*Primary Examiner*—Nathan M Nutter
(74) *Attorney, Agent, or Firm*—Nixon & Vanderhye

(57) ABSTRACT

A screw cap is disclosed comprising a composition based on a multimodal ethylene polymer having a standard density (SD) greater than 950 kg/m$^3$ and a melt flow index MI$_2$ of less than 10 g/10 min, said multimodal ethylene polymer comprising from 35 to 65 wt %, based on the total weight of the multimodal ethylene polymer, of a fraction of ethylene polymer (A) having an SD(A) of more than 965 kg/m$^3$ and a melt flow index MI$_2$(A) of at least 10 g/10 min, and from 65 to 35 wt % based on the total weight of the multimodal ethylene polymer, of a fraction of a copolymer (B) of ethylene and at least one alpha-olefin containing from 3 to 12 carbon atoms, and having a melt flow index MI$_2$(B) of less than 10 g/10 min and a content of said alpha-olefin(s) of from 0.1 to 5 mol %. This composition is said to demonstrate an excellent balance between ESCR, injectability and impact resistance, together with excellent organoleptic properties.

13 Claims, No Drawings

SCREW CAP COMPOSITION

This application is a continuation of application Ser. No. 11/889,854, filed Aug. 16, 2007, which is a continuation of application Ser. No. 10/494,731, filed May 6, 2004, which is a 371 of PCT/EP02/12382, filed Nov. 6, 2002, the entire content of which is hereby incorporated by reference in this application.

The present invention relates to screw caps comprising a composition based on multimodal ethylene polymer. It also relates to a process for manufacturing said caps and their use for the closure of bottles, in particular bottles containing foodstuffs, and more particularly fizzy drinks.

It is known to use polyethylene, and more particularly bimodal polyethylene, for the manufacture of caps. Thus applications U.S. Pat. No. 5,981,664 and WO 00/71615 describe caps obtained by injection of a composition comprising two polyethylenes having different molecular weight distributions. However, the compositions described in said documents do not have the optimum properties for the manufacture of caps, more particularly for caps intended for the closure of bottles containing fizzy drinks.

We have now found screw caps comprising a composition based on multimodal ethylene polymer which do not possess the above-mentioned drawbacks.

To this end, the present invention relates to screw caps comprising a composition based on a multimodal ethylene polymer having a standard density (SD) greater than 950 kg/m$^3$ and a melt flow index MI$_2$ of less than 10 g/10 min, said multimodal ethylene polymer comprising— from 35 to 65 wt %, based on the total weight of the multimodal ethylene polymer, of a fraction of ethylene polymer (A) having an SD(A) of more than 965 kg/m$^3$ and a melt flow index MI$_2$(A) of at least 10 g/10 min, and from 65 to 35 wt %, based on the total weight of the multimodal ethylene polymer, of a fraction of a copolymer (B) of ethylene and at least one alpha-olefin containing from 3 to 12 carbon atoms, and having a melt flow index MI$_2$(B) of less than 10 g/10 min and a content of said alpha-olefin(s) of from 0.1 to 5 mol %.

Within the scope of the present invention, the term "screw caps" is meant screw caps possessing a threaded closure. In most cases, said screw caps are provided with a tear strip.

By "multimodal ethylene polymer" is meant an ethylene polymer comprising at least two fractions having different melt flow indices (MI$_2$) so that it possesses a broad or multimodal molecular weight distribution.

The multimodal ethylene polymer used in the present invention has generally a standard density (SD) which does not exceed 965 kg/m$^3$. Within the scope of the present invention, the SD is measured according to the standard ISO 1183-3 (1999). The SD preferably does not exceed 960 kg/m$^3$, more particularly not 958 kg/m$^3$. The SD is preferably at least 951 kg/m$^3$.

The multimodal ethylene polymer used in the present invention preferably possesses a melt flow index (MI$_2$) measured at 190° C. under a load of 2.16 kg according to the standard ASTM D 1238 (1998) of less than 4 g/10 min. MI$_2$ values of less than 2 g/10 min are particularly preferred. The melt flow index MI$_2$ is, in general, at least 0.5 g/10 min, and may be at least 0.8 g/10 min; values of at least 1.2 g/10 min being particularly recommended. Melt flow indices of 1.4 to 1.8 g/10 min are very particularly preferred.

The fraction of ethylene polymer (A) in the multimodal ethylene polymer is preferably at least 40%, more particularly at least 45% by weight compared with the total weight of the multimodal ethylene polymer. The fraction of ethylene polymer (A) preferably does not exceed 60 wt %, more particularly it does not exceed 55 wt % compared with the total weight of the multimodal ethylene polymer. Good results were obtained with a fraction of ethylene polymer (A) of 48 to 52 wt % compared with the total weight of the multimodal ethylene polymer.

The fraction of ethylene copolymer (B) in the multimodal ethylene polymer is preferably at least 40%, more particularly at least 45 wt % by weight compared with the total weight of the multimodal ethylene polymer. The fraction of ethylene copolymer (B) preferably does not exceed 60 wt %, more particularly not 55 wt % compared with the total weight of the multimodal ethylene polymer. Fractions of ethylene copolymer (B) of 48 to 52 wt % compared with the total weight of the multimodal ethylene polymer have given good results.

The composition used in the present invention generally contains at least 95%, preferably at least 98% by weight of the whole of the polymer (A) and the copolymer (B). Most particularly preferred is a composition consisting mainly of the polymer (A) and the copolymer (B).

Preferably, the polymer (A) is an ethylene homopolymer. For the purposes of the present invention, there is taken to mean by ethylene homopolymer (A) an ethylene polymer consisting mainly of monomer units of ethylene and substantially devoid of monomer units derived from other olefins.

By ethylene copolymer with one or more alpha-olefins containing from 3 to 12 atoms of carbons (copolymer (B)) is taken to mean a copolymer comprising monomer units derived from ethylene and monomer units derived from at least one alpha-olefin containing from 3 to 12 atoms of carbon. The alpha-olefin may be selected from among olefinically unsaturated monomers such as butene-1, pentene-1, hexene-1, octene-1, butene-1 is particularly preferred. The content of alpha-olefin in the copolymer (B) is with advantage at least equal to 0.2 molar %, in particular at least equal to 0.3 molar %. The content of alpha-olefin in the copolymer (B) is preferably at most equal to 4 molar %, more precisely at most equal to 3 molar %. Particularly good results are obtained with alpha-olefin contents in the copolymer (B) of 0.5 to 2 molar %.

The SD of the polymer (A) (SD(A)) is preferably at least 968 kg/m$^3$, more particularly at least 970 kg/m$^3$. With advantage, the polymer (A) is characterised by a value of MI$_2$(A) of at least 30 g/10 min, more particularly at least 50 g/10 min. Preferably, the value of MI$_2$(A) does not exceed 500 g/10 min, values of less than 400 g/10 min being particularly preferred. Melt flow indices MI$_2$(A) of at least 80 g/10 min, particularly 80 to 200 g/10 min, have given good results.

Preferably, copolymer (B) is characterised by a value of MI$_2$(B) of at least 0.03 g/10 min, more particularly of at least 0.06 g/10 min. There is preferred most particularly a value of MI$_2$(B) of at least 0.08 g/10 min. Preferably, the value of MI$_2$(B) does not exceed 2 g/10 min, values of at most 1 g/10 min being particularly preferred. There is preferred most particularly an MI$_2$(B) value of at most 0.8 g/10 min, more preferably no more than 0.5 g/10 min. Melt flow indices MI$_2$(B) of 0.08 to 0.8 g/10 min have given good results.

The multimodal ethylene polymer used in the present invention may be obtained by any suitable technique. It is possible, for example, to perform the mixing of the polymer (A) and the copolymer (B) by any known process such as, for example, the molten mixing of the two preformed polymers. Preferred, however, are processes in the course of which the polymer (A) and the copolymer (B) are prepared in at least two successive polymerisation stages. In general, first of all the preparation of the polymer (A) is performed and then the preparation of the copolymer (B) in the presence of the polymer (A) obtained from the first polymerisation stage. The polymerisation stages may each be carried out, independently of one another, in suspension in an inert hydrocarbon diluent or in gaseous phase. A process comprising at least two polymerisation stages in suspension in a hydrocarbon diluent is preferred. The hydrocarbon diluent is generally chosen from among aliphatic hydrocarbons containing from 3 to 10 carbon atoms. Preferably, the diluent is chosen from among propane, isobutane, hexane or their mixtures.

In addition to the multimodal ethylene polymer, the composition used in the present invention may contain conventional additives such as antioxidants, antacids, UV stabilisers, dyes, fillers, antistatic agents and lubricating agents. The total content of additives generally does not exceed 5 wt % compared with the total weight of the composition used in the present invention. Preferably it does not exceed 2 wt %.

The composition used for the manufacture of caps according to the invention may be obtained by any suitable known means. It is possible, for example, to employ two successive stages, the first comprising mixing the multimodal ethylene polymer and where applicable the additives at ambient temperature, the second stage comprising continuing the mixing in the molten state in an extruder. The temperature of the second stage is generally from 100 to 300° C., in particular from 120 to 250° C., more particularly from about 130 to 210° C. An alternative method comprises introducing the additives and where applicable the other compounds into the already molten multimodal ethylene polymer.

It is also possible to prepare, in an initial stage, a master batch comprising a first fraction of the multimodal ethylene polymer plus any additives, said master batch being rich in additives and optionally in other compounds. The master batch is then mixed with the remaining fraction of the multimodal ethylene polymer, for example during the manufacture of granules of the composition.

The screw caps according to the invention may be obtained by any known technique for the manufacture of objects. Injection moulding is particularly well suited.

The screw caps according to the present invention have good organoleptic properties which render them suitable to be used on bottles containing foodstuffs. In addition, they possess a good resistance to slow cracking. The screw caps according to the present invention have an acceptable opening torque. They possess in addition good dimensional tolerances. They are therefore particularly well suited to being used on bottles containing fizzy drinks. The invention consequently also relates to the use of the caps according to the invention for the closure of bottles containing foodstuffs, more particularly for the closure of bottles containing fizzy drinks. A further aspect of the invention relates to screw caps comprising a composition based on a multimodal ethylene polymer and having an ESCR(B) greater than 800 hours, a notched Charpy impact resistance greater than 7 kJ/m², and an injectability greater than 2.8 s. Preferably the screw caps of this aspect of the invention comprise composition is having a standard density greater than 950 kg/m³, and/or a melt flow index $MI_2$ of less than 10 g/10 min. It is also preferred that they are based on compositions according to the first aspect of the present invention.

The Examples which are described below serve to illustrate the invention. The meanings of the symbols used in these examples, the methods of measurement and the units of these quantities are explained below:

[A]: fraction of ethylene polymer (A) expressed in wt % compared with the total weight of the multimodal ethylene polymer.

[B]: fraction of ethylene copolymer (B) expressed in wt % compared with the total weight of the multimodal ethylene polymer.

$MI_2$: melt flow index of the multimodal ethylene polymer, expressed in g/10 min, measured at 190° C. under a load of 2.16 kg according to the standard ASTM D 1238 (1998).

$MI_2(A)$: melt flow index of the ethylene polymer (A), expressed in g/10 min, measured at 190° C. under a load of 2.16 kg according to the standard ASTM D 1238 (1998); in cases where the multimodal ethylene polymer is manufactured by a process of two successive polymerisation stages, said value is measured on a sample of the polymer (A) taken from the first reactor.

$MI_2(B)$: melt flow index of the ethylene copolymer (B), expressed in g/10 min, measured at 190° C. under a load of 2.16 kg according to the standard ASTM D 1238 (1998); in cases where the multimodal ethylene polymer is manufactured by a process of two successive polymerisation stages, this value is calculated on the basis of the $MI_2$ and $MI_2(A)$ values.

$MI_5(B)$: melt flow index of the ethylene copolymer (B), expressed in g/10 min, measured at 190° C. under a load of 5 kg according to the standard ASTM D 1238 (1998).

SD: standard density of the multimodal ethylene polymer, expressed in kg/m³, measured according to the standard ISO 1183-3 (1999).

SD(A): standard density of the ethylene polymer (A), expressed in kg/m³, measured according to the standard ISO 1183-3 (1999); in cases where the multimodal ethylene polymer is manufactured by a process of two successive polymerisation stages, this value is measured on a sample of the polymer (A) taken from the first reactor.

$C_4(B)$: content of butene-1 of the ethylene copolymer (B), expressed in molar %. Said content is calculated according to the following equation:

$$C_4(B) \frac{100 \times C_4 \text{ total}}{[B]}$$

in which $C_4$ total represents the content of butene-1 of the multimodal ethylene polymer used, determined by nuclear magnetic resonance in $^{13}C$, and is expressed in molar %.

ESCR: resistance to slow cracking, measured by the following method: 10 caps are screwed onto stainless steel preforms, the assembly is then immersed in a water bath at 60° C. A hydrostatic pressure of 8 bar is applied in the preform. The service life, expressed in hours, is recorded as soon as a break appears.

ESCR-A: resistance to slow cracking, expressed in hours, measured according to the standard ASTM D 1693 (1980), condition A, by immersion in an aqueous solution containing 10 vol % of nonylphenoxy-poly(ethyleneoxy)ethanol at 50° C. of a plate obtained by compression of the composition used in the present invention according to the standard ASTM D 1928 (1980).

ESCR-B: resistance to slow cracking, expressed in hours, measured according to the standard Bell Telefon Test ASTM D1693 condition B, with temperature=23° C. and 25% of nonyl-phenol-ethoxyl. Compression moulding of samples according to ASTM D1928.

OT: opening torque, measured by the following method: Ten caps are screwed onto 33 cl glass bottles by means of a Zalkin single-head laboratory machine and so as to close the caps with a screwing torque fixed at 2.83 Nm. The unscrewing torque is measured. The OT value is the mean of the values obtained for the ten caps and is expressed in Nm.

OI: organolepticity index, measured by the following method: 33 g of the composition based on ethylene polymer in granule form are suspended in 1 liter of water for 4 hours at 60° C. Then, 6 different operators taste the water of the suspension, which is cooled to ambient temperature, and evaluate its taste. They each give a mark from 1 to 4 by comparison with a water sample that has undergone the same treatment in the absence of granules, the mark of 1 corresponding to the taste of said water sample. A high mark corresponds to a bad taste. The organolepticity index (OI) is the mean of the marks of the 6 operators.

OIS: organolepticity index after exposure to the sun, measured by the following method: 33 cl glass bottles are filled with water and fitted with caps injected-moulded 1 week-before. Said bottles are exposed for 48 hours at 40° C. at 600 W/m$^2$ to the solar spectrum in a sun test apparatus. Then, the taste of the water is tested by the same method as that described above for the determination of the OI.

Taste: 25 g of polymer pellets in 500 ml of mineral water are maintained at 60° C. for 48 hours, before cooling to 23° C. for 24 hours. The solution is then filtered and four 50% dilutions carried out to give five solutions, ranging from Solution 1, the <<Mother solution >> to Solution 5, a ⅟16 dilution. Each solution is tasted by the assessor, starting with the most dilute solution and finishing with the mother solution. When any taste is detected, the sample is accorded a score corresponding to the number of that solution (5, 4, 3, 2, 1). Consequently the higher the score, the worse the taste. If no taste is detected even in the mother solution, the score is 0. The final Taste value is the average of all scores (panel of 6 assessors at least).

Odour: 400 ml of polymer pellets are placed in a 500 ml glass flask, which is sealed and heated to 80° C. for 30 minutes. The flask is then allowed to cool to 23° C. Evaluations are compared with a standard resin, which is taken to have a constant odour level of 0.5. The cooled pellets are smelt by each assessor in comparison with the standard. Scores can be given from 0 (no odour relative to standard) to 3 (strong odour) in increments of 0.5. The final Odour value is the average of all scores (panel of 6 assessors at least).

Notched Charpy Impact Resistance: this was measured according to ISO179.

Injectability: This is 1/viscosity at 1000 s$^{-1}$ and 190° C., with a 15/1 die.

$Ø_m, Ø_{min}, Ø_{max}$: respectively mean, minimum and maximum diameter, calculated on ten measurements for caps having a nominal diameter of 30.5 mm.

$\sigma_m, \sigma_{min}, \sigma_{max}$: respectively mean, minimum and maximum distortion of the plate of the cap, calculated on ten measurements.

EXAMPLES 1, 2

In an extruder, there was mixed (at 190° C.) and granulated a composition consisting of:

99.7 parts by weight of multimodal ethylene polymer manufactured by a process such as that disclosed in the patent application EP 603935A;

0.2 part by weight of calcium stearate;

0.1 part by weight of [tris(2,4-di-t-butyl-phenyl)phosphite].

The characteristics of the ethylene polymers used in the examples are given in Table 1 below.

Screw caps were manufactured by injection moulding on a Netstal machine fitted with an 18-cavity mould.

The characteristics of the caps obtained are also contained in Table 1 below.

EXAMPLES 3R-5R

Comparative

The operations of Examples 1 and 2 were repeated, but using ethylene polymers not conforming to the invention and whose characteristics are given in Table 1 below.

A comparison of Examples 1 and 2 with Example 3R shows that the screw caps according to the invention have a far superior resistance to cracking than a cap not conforming to the invention.

A comparison of Examples 1 and 2 with Examples 5R and 4R respectively shows that the screw caps according to the invention have a far better resistance to slow cracking.

EXAMPLES 6R, 7R

Comparative

In Examples 6R and 7R, ethylene polymers of the monomodal type were used.

A comparison of Examples 1 and 2 with Examples 7R and 6R respectively shows that the screw caps according to the invention possess a resistance to slow cracking which is superior to that of caps based on a monomodal ethylene polymer.

A comparison of Example 1 with Example 7R shows in addition that the screw caps according to the invention have organoleptic properties (OI and OIS) and dimensional tolerances at least as good, if not better, than those obtained from a composition based on a monomodal polyethylene, with equivalent opening torque values.

EXAMPLES 8-12

For these Examples of the invention, the two blocks were made separately and then flake blended. Their properties are shown in Table 2, together with those of Example 1 and also Examples 13R and 14R.

EXAMPLES 13R, 14R

These are commercial products used for the manufacture of caps. Example 13R is monomodal, Example 14R is bimodal.

TABLE 1

| Property | Unit | 1 | 2 | 3R | 4R | 5R | 6R | 7R |
|---|---|---|---|---|---|---|---|---|
| $MI_2$ | g/10 min | 1.6 | 1.5 | 1.6 | 10.1 | 10.1 | 2 | 1.7 |
| SD | kg/m$^3$ | 951.6 | 955.5 | 964.9 | 955.7 | 952.7 | 957 | 952.1 |
| $MI_2(A)$ | g/10 min | 117 | 121 | 131 | 137 | 122 | — | — |
| SD(A) | kg/m$^3$ | 970.6 | 970.7 | 970.9 | 971 | 970.7 | — | — |
| $MI_2(B)$ | g/10 min | 0.29 | 0.27 | 0.2 | 2.39 | 2.74 | — | — |
| [A] | wt % | 49.3 | 49.6 | 50 | 49.5 | 50.1 | — | — |
| [B] | wt % | 50.7 | 50.4 | 50 (*) | 50.5 | 49.9 | — | — |
| C4(B) | mol % | 1.2 | 0.8 | 0 (*) | 1.1 | 1.6 | — | — |
| ESCR | hour | 214 | 54 | 3 | 4 | — | 18 | 58 |
| ESCR-A | hour | >500 | 217 | 16.7 | 0 | 4.4 | 12 | 43 |
| OT | Nm | 2.54 | 2.20 | 1.98 | — | — | 2.15 | 2.37 |
| OI | — | 1.4 | 1.7 | — | — | 1.8 | — | 1.8 |
| OIS | — | 2.7 | 2.5 | — | — | — | — | 3.2 |
| $Ø_m$ | mm | 30.5 | 30.6 | — | — | — | — | 30.6 |
| $Ø_{min}$ | mm | 30.4 | 30.45 | — | — | — | — | 30.35 |
| $Ø_{max}$ | mm | 30.6 | 30.7 | — | — | — | — | 30.8 |
| $σ_m$ | mm | 0.4 | 0.4 | — | — | — | — | 0.5 |
| $σ_{min}$ | mm | 0.18 | 0.15 | — | — | — | — | 0.3 |
| $σ_{max}$ | mm | 0.68 | 0.69 | — | — | — | — | 0.76 |

(*) ethylene homopolymer

TABLE 2

| Property | Unit | 1 | 8 | 9 | 10 | 11 | 12 | 13R | 14R |
|---|---|---|---|---|---|---|---|---|---|
| $MI_2$ | g/10 min | 1.60 | 1.68 | 0.60 | 0.86 | 0.69 | 0.53 | 2.1 | 3.7 |
| SD | kg/m$^3$ | 951.6 | 952.4 | 952.7 | 952.9 | 952.8 | 951.2 | 950.9 | 953.6 |
| $MI_2(A)$ | g/10 min | 117 | 110 | 151 | 125 | 245 | 391 | — | — |
| SD(A) | kg/m$^3$ | 970.6 | 971.4 | 971.2 | 971.7 | 972.5 | 972.4 | — | — |
| $MI_2(B)$ | g/10 min | 0.29 | 0.23 | 0.12 | 0.06 | 0.12 | 0.06 | — | — |
| $MI_5(B)$ | g/10 min | | 0.7 | 0.35 | 0.18 | 0.36 | 0.19 | — | — |
| [A] | % weight | 49.3 | 50.0 | 45.0 | 55.0 | 45.0 | 50.0 | — | — |
| [B] | % weight | 50.7 | 50.0 | 55.0 | 45.0 | 55.0 | 50.0 | — | — |
| SCB comp. | nb/1000 C. | 3.6 | 2.9 | 2.2 | 2.7 | 2.1 | 2.7 | — | — |
| C4(B) calc. | % molar | 1.44% | 1.17% | 0.81% | 1.21% | 0.77% | 1.09% | — | — |
| Notched Charpy 23° C. | kJ/m$^2$ | 7.3 | 7.4 | 10.4 | 8.2 | 9.8 | 9.8 | 13.0 | 5.1 |
| ESCR-B | hour | >1000 | >1000 | >1000 | >1000 | >1000 | >1000 | 600 | 300 |
| Injectability | s | 3.85 | 3.45 | 2.86 | 3.57 | 2.94 | 3.33 | 2.56 | 4.55 |
| OI | — | 1.4 | — | — | — | — | — | 1.3 | — |
| Taste | — | 0.2 | 0 | 0.2 | 0.8 | 0 | 1.4 | 0.2 | 0 |
| Odour | — | 0.1 | 0 | 0.2 | 0.7 | 0.1 | 0.4 | 0.1 | 0.5 |

The results in the above Tables emphasize the excellent balance between ESCR, Injectability and Impact Resistance, together with the excellent organoleptic properties of the compositions of the invention in comparison with the prior art and also commercial resins.

The invention claimed is:

1. A screw cap comprising a screw cap formed from a composition based on a multimodal ethylene polymer having a standard density (SD) greater than 950 kg/m$^3$ and a melt flow index $MI_2$ of from 0.8 to less than 2 g/10 min, wherein said multimodal ethylene polymer includes from 45 to 55 wt %, based on the total weight of the multimodal ethylene polymer, of a fraction of ethylene polymer (A) having an SD(A) of more than 965 kg/m$^3$ and a melt flow index $MI_2$(A) of from 80 to 200 g/10 min, and from 55 to 45 wt % based on the total weight of the multimodal ethylene polymer, of a fraction of a copolymer (B) of ethylene and at least one alpha-olefin containing from 3 to 12 carbon atoms, and having a melt flow index $MI_2$(B) of less than 10 g/10 min and a content of said at least one alpha-olefin of from 0.1 to 5 mol %.

2. The screw cap according to claim 1, wherein the multimodal ethylene polymer has a melt flow index $MI_2$ of from 1.2 to less than 2 g/10 min.

3. The screw cap according to claim 1, wherein the multimodal ethylene polymer has an SD of no more than 960 kg/m$^3$.

4. The screw cap according to claim 2, wherein the multimodal ethylene polymer has an SD of no more than 960 kg/m$^3$.

5. The screw cap according to claim 3, wherein the SD is 951-958 kg/m$^3$.

6. The screw cap according to claim 4, wherein the SD is 951-958 kg/m$^3$.

7. The screw cap according to claim 1, wherein $MI_2$(B) is less than 0.8 g/10 min.

8. The screw cap according to claim 7, wherein $MI_2$(B) is less than 0.5 g/10 min.

9. The screw cap according to claim 1, wherein SD(A) is at least 969 kg/m$^3$.

10. The screw cap according to claim 1, wherein said multimodal ethylene polymer includes from 48 to 52 wt % of ethylene polymer (A) and from 48 to 52 wt % of copolymer (B).

11. The screw cap according to claim 1, wherein copolymer (B) contains monomer units derived from ethylene and butene-1.

12. The screw cap according to claim 1, wherein the multimodal ethylene polymer is obtained by polymerization in at least two reactors connected in series.

13. A screw cap comprising a screw cap formed from a composition based on a multimodal ethylene polymer having a standard density (SD) greater than 950 kg/m$^3$, a melt flow index MI$_2$ of from 0.8 to less than 2 g/10 min, an ESCR(B) greater than 800 hours, a notched Charpy impact resistance greater than 7 kJ/m$^2$, and an injectability greater than 2.8s, wherein said multimodal ethylene polymer includes from 45 to 55 wt %, based on the total weight of the multimodal ethylene polymer, of a fraction of ethylene polymer (A) having an SD(A) of more than 965 kg/m$^3$ and a melt flow index MI$_2$(A) of from 80 to 200 g/10 min and from 55 to 45 wt % based on the total weight of the multimodal ethylene polymer, of a fraction of a copolymer (B) of ethylene and at least one alpha-olefin containing from 3 to 12 carbon atoms, and having a melt flow index MI$_2$(B) of less than 10 g/10 min and a content of said at least one alpha-olefin of about 0.1 to 5 mol %.

* * * * *